June 20, 1939.  K. SCHLESINGER  2,163,218
MAINS SUPPLY APPARATUS
Filed March 23, 1936
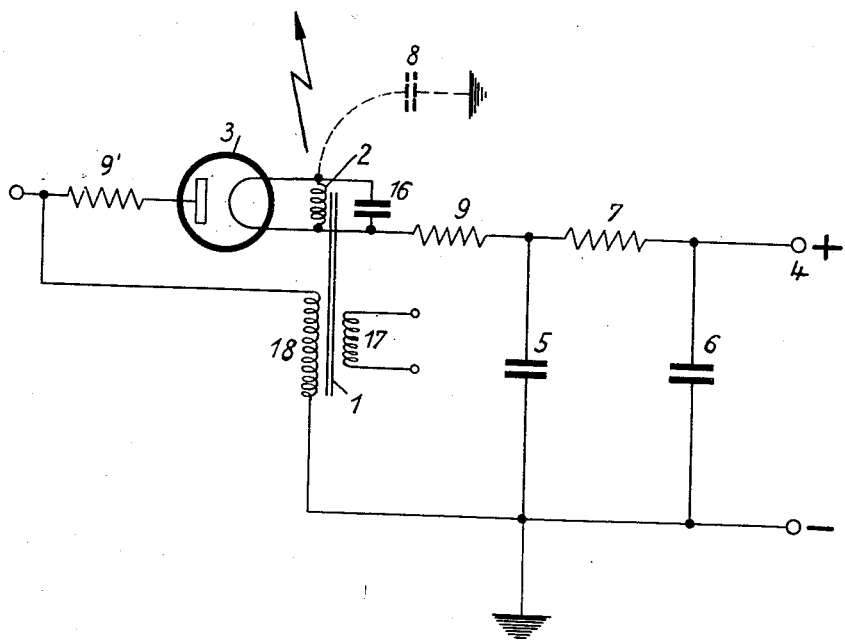
Inventor:
Kurt Schlesinger Patented June 20, 1939

2,163,218

UNITED STATES PATENT OFFICE 2,163,218

MAINS SUPPLY APPARATUS

Kurt Schlesinger, Berlin, Germany, assignor to Radioaktiengesellschaft D. S. Loewe, Berlin-Steglitz, Germany Application March 23, 1936, Serial No. 70,426
In Germany March 29, 1935

2 Claims. (Cl. 175—363)

The invention relates to elimination of disturbances in reception caused by the operation of power supply apparatus for high potential if these are located in the vicinity of sensitive receiving apparatus. Such disturbances occur frequently in television apparatus requiring a supply of several thousand volts for the cathode ray tubes employed therein. A power supply apparatus of this kind will always possess in practice a rectifying circuit, about of the type shown in the drawing figure, consisting of a transformer 1 of which the primary 17 is connected to the mains, one secondary 18 furnishes the high tension to be rectified whilst the second secondary 2 heats the cathode of the rectifying tube 3. The consuming apparatus is connected with the terminals 4. The smoothing of the direct current takes place by means of condensers 5 and 6 and resistance 7.

When the rectified high potential is positive towards earth, the cathode of tube 3 and consequently the heating winding 2 carries this potential in relation to the surroundings. Now it has been found in practice that a slight and in other respects harmless corona on the heating winding 2 towards earth or other adjacent conductors of low potential excites disturbing high-frequency oscillations, apparently in the high-frequency circuit formed by the self-inductance of the heating winding 2 and its earth capacity 8. In this way flashes of light result in the image of the television receiver, or crackling noises in the sound receiver.

According to the invention, this is remedied by a condenser 16 of, for example, 0.01 mf. connected in parallel to the flashing winding 2 lowering the frequency of the spurious oscillations to a value no longer disturbing. Protection resistances or chokes 9, 9' may also be provided.

If the rectifying tube 3 is indirectly heated its cathode has to be connected, as usual in this case, with one terminal of the heating resistance, as the insulation between both would not withstand the high voltage.

I claim:

1. In a power supply apparatus for high voltage comprising a transformer having a primary connected to the mains, a high tension secondary and a low tension secondary, a rectifier tube connected to said high tension secondary and having a hot cathode heated by said low tension secondary, and smoothing elements for the rectified current, said cathode having such high voltage towards earth that by flashing disturbing high frequency oscillations are produced, a condenser shunting said low tension winding, said condenser having a capacity sufficient to detune said oscillations to a not interfering frequency.

2. In a power supply apparatus for high voltage comprising a transformer having a primary connected to the mains, a high tension secondary and a low tension secondary, a rectifier tube connected to said high tension secondary and having a hot cathode heated by said low tension secondary, and smoothing elements for the rectified current, said cathode having such high voltage towards earth that by flashing disturbing high frequency oscillations are produced, a condenser shunting said low tension winding, said condenser having a capacity sufficient to detune said oscillations to a not interfering frequency, and choking resistances inserted in the leads to said tube.

KURT SCHLESINGER.